US006474222B1

(12) United States Patent
Pretre

(10) Patent No.: US 6,474,222 B1
(45) Date of Patent: Nov. 5, 2002

(54) DOMESTIC ELECTRICAL APPLIANCE FOR STEAM COOKING WITH REDUCED RELEASE OF STEAM

(75) Inventor: Nicolas Pretre, Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/128,420

(22) Filed: Apr. 24, 2002

(30) Foreign Application Priority Data

Apr. 26, 2001 (FR) .............................. 01 05647

(51) Int. Cl.[7] .............................. A23L 1/00; A47J 27/00; A47J 27/04; F27D 7/02
(52) U.S. Cl. .............................. 99/331; 99/416; 99/417; 99/448; 99/476; 99/483; 126/20; 126/369; 219/401
(58) Field of Search .............................. 99/330, 331–333, 99/339, 340, 345–347, 403, 410, 416–418, 444–450, 473–476, 467, 483, 516, 536; 219/401, 400, 415, 442; 426/418, 509–511, 523; 126/369, 369.1, 369.2, 20, 21 A

(56) References Cited

U.S. PATENT DOCUMENTS

| 3,604,895 | A | * | 9/1971 | MacKay | 219/401 |
| 4,509,412 | A | * | 4/1985 | Whittenburg et al. | 99/331 |
| 4,655,192 | A | * | 4/1987 | Jovanovic | 126/20 |
| 5,235,903 | A | * | 8/1993 | Tippmann | 99/331 |
| 5,458,050 | A | * | 10/1995 | Su | 99/340 |
| 5,525,782 | A | * | 6/1996 | Yoneno et al. | 219/401 X |
| 5,532,456 | A | * | 7/1996 | Smith et al. | 99/467 X |
| 5,802,963 | A | * | 9/1998 | Cohn et al. | 99/476 |
| 5,901,642 | A | * | 5/1999 | Su | 99/483 X |
| 5,938,959 | A | * | 8/1999 | Wang | 219/401 X |
| 6,121,583 | A | * | 9/2000 | Hansen | 219/401 |
| 6,230,612 | B1 | * | 5/2001 | Rossi | 99/417 X |
| 6,323,464 | B1 | * | 11/2001 | Cohn | 99/331 X |

FOREIGN PATENT DOCUMENTS

| DE | 197 09 943 A1 | 9/1998 |
| EP | 0 664 097 A1 | 1/1995 |
| EP | 0 832 590 A2 | 8/1997 |
| GB | 2 198 631 A1 | 6/1998 |
| GB | 2 332 095 A1 | 6/1999 |

* cited by examiner

Primary Examiner—Timothy F. Simone
(74) Attorney, Agent, or Firm—Browdy and Neimark, PLLC

(57) ABSTRACT

A domestic electrical appliance for cooking with steam, having a steam production device (43) composed of a steam reservoir (45) associated with a heating unit (46), a cooking enclosure (41) supplied with steam by the steam production device, and a steam detector (49) associated with elements for reducing the power of the heating unit, the cooking enclosure (41) having at least one exhaust (61, 61', 62, 62') to the outside. The cooking enclosure (41) communicates through a descending conduit (63) with a chamber (64) of the appliance in which the steam detector (49) is disposed.

20 Claims, 4 Drawing Sheets

DOMESTIC ELECTRICAL APPLIANCE FOR STEAM COOKING WITH REDUCED RELEASE OF STEAM

BACKGROUND OF THE INVENTION

The present invention relates to the general technical field of domestic electrical appliances designed for steam cooking.

In general terms, steam cookers have a cooking enclosure associated with a water reservoir, the water in the reservoir being heated to produce steam serving to cook the foodstuffs contained in the cooking enclosure. Electric steam cooking appliances have an electric heating means, or element for producing steam from the water in the reservoir.

When the water has reached its boiling point, steam is produced in large quantities. An electric steam cooking appliance having high heating capacity has the advantage of reaching boiling point quickly, and producing steam in large quantities. However, some of the steam may then not be used for heating the foodstuffs. The result is a more or less significant output of steam outside the appliance, as well as a loss of energy.

The patent document GB 2 198 631 discloses the use of a steam detector for reducing the heating power, so as to avoid production of excessive steam. One drawback of the appliance described in this document lies in the fact that the steam reaches the steam detector without having passed through the cooking enclosure. Thus the reduction in the heating power does not take account of the foodstuffs present in the cooking enclosure. Another drawback of the appliance described in this document lies in the fact that the heating element is disposed in the main water reservoir. As a result, the rate of increase of the temperature of the water contained in the reservoir remains limited even with a high heating power, and the production of steam takes a long time to occur.

BRIEF SUMMARY OF THE INVENTION

The present invention provides a domestic electrical appliance for steam cooking which reconciles effective cooking with a limitation of the discharge of steam outside the appliance.

The present invention also provides a domestic electrical appliance for steam cooking of the aforementioned type, which is economical to make.

The present invention further provides a domestic electrical appliance for steam cooking of the aforementioned type which is easy to use.

A domestic electrical appliance for steam cooking according to the invention comprises: a steam production device that includes a water reservoir and heating means for heating water in the reservoir; a cooking enclosure associated with the steam production device to be supplied with steam by the steam production device, the cooking enclosure having at least one exhaust to the outside; a steam detector; control means operatively associated with the steam detector for reducing the rate of heat generation by the heating means; and a descending conduit that communicates between the cooking enclosure and the steam detector for directing a flow of steam from the cooking enclosure to the steam detector.

Tests have shown that, during cooking, an offset in time exists between the appearance of a high flow of vapor, or steam, in the appliance and the exit of a significant steam output from the appliance. This is because, at the start of cooking, the foodstuffs begin by absorbing the steam to a major extent, and their temperature increases. As long as the foodstuffs are absorbing a major part of the steam produced, the excess quantities of steam leave the cooking enclosure without difficulty through the exhaust or exhausts. When the surface temperature of the foodstuffs approaches the temperature of the steam, the ability of the foodstuffs to absorb the heat from the steam decreases, and the quantity of steam escaping from the cooking enclosure tends to increase.

However, when the excess quantities of steam increase, the exhaust or exhausts limit the discharge rate. The steam must then descend through the conduit in order to reach the detection zone of the detector for controlling the reduction in power of the heating element. Because of this, the steam which has reached the cooking enclosure does not immediately reach the detector. The cooking can therefore continue at full power for a longer period, which improves the effectiveness of the appliance.

In a second step, the steam flow generated at reduced power supplies the energy necessary for continuing the cooking, without excessive losses.

Compared with an appliance that continuously supplies a reduced heating power, the duration of cooking is reduced in an appliance according to the invention. The ejection of steam to the outside is greater only in the transition phase serving to trigger the steam detector. The more rapid rise in temperature of the foodstuffs necessarily contributes to a better preservation of the vitamins.

Compared with an appliance continuously supplying the maximum power, the cooking duration remains identical in an appliance according to the invention, but the ejection of steam is less substantial in the second part of the cooking process when the foodstuffs have risen in temperature. Because of the lower rate of consumption of water in the second part of the cooking process, the possible cooking time of the appliance with a given initial supply of water is increased.

Advantageously, the steam production device has a main reservoir supplying the water reservoir associated with the heating means, this arrangement making it possible to obtain steam more rapidly and to more easily modulate the steam output between full power of the heating element and reduced power.

According to an advantageous provision notably facilitating the cleaning of the cooking enclosure, the steam production device is arranged in a heating base, and the cooking enclosure is removable with respect to the heating base.

Then, advantageously, the steam detector is disposed in the heating base. This arrangement facilitates the transmission of the information supplied by the steam detector in order to reduce the power of the heating means. This arrangement also facilitates the cleaning of the cooking enclosure.

Advantageously, the descending conduit is provided at least partly in a side wall of the cooking enclosure. This arrangement makes it possible to collect the steam in the top part of the cooking enclosure, after it has passed through the foodstuffs. As long as the foodstuffs absorb sufficient steam and the exhausts permit the discharge of the remaining steam, full power can be preserved. The result is a higher cooking speed.

Then, advantageously, the cooking enclosure has at least two removable cooking receptacles each containing a part of the descending conduit. This arrangement makes it possible to use one or more cooking receptacles.

Advantageously, the descending conduit is provided at least partly in the heating base. This arrangement simplifies the design of the cooking enclosure, the steam detector then being able to be arranged in the heating base.

Advantageously, to make it possible to discharge the condensates, the detector is disposed in a chamber connected to an outlet flowing towards the outside of the appliance.

Advantageously, the descending conduit is connected to the cooking enclosure by an inlet arranged lower than the exhaust or exhausts. This arrangement assists the discharge of the steam through the exhausts and makes it possible to delay the progress of the steam in the descending conduit.

Advantageously, the descending conduit is connected to the cooking enclosure by an inlet whose cross-section is greater than the sum of the cross-sections of the exhaust or exhausts. When the flow of steam becomes too great to flow completely through the exhaust or exhausts, this arrangement assists the progression of the steam in the descending conduit.

Advantageously, the descending conduit is connected to the cooking enclosure by an inlet arranged close to at least one of the exhausts. This arrangement reduces the range of flow of steam necessary for triggering the detector.

Then, advantageously, at least one of the exhausts is arranged at a distance from the inlet. It has been observed that this configuration makes it possible to reduce the steam flow threshold necessary for triggering the detector.

Then, advantageously, the ratio between the cross-section of the exhaust or exhausts arranged at a distance from the inlet and the cross-section of the exhaust or exhausts arranged close to the inlet is between 1.6 and 2.4. This arrangement makes it possible to obtain a relatively stable detection threshold.

Advantageously the exhaust or at least one of the exhausts is provided in a lid forming the top wall of the cooking enclosure. This arrangement assists the discharge of the steam through the exhaust or exhausts concerned.

Then, advantageously, the descending conduit has an inlet arranged lower than the exhaust or exhausts provided in the lid. This arrangement facilitates the production of the lid and conduit.

Then, advantageously, the cooking enclosure has a cooking receptacle in which at least one portion of the descending conduit is provided and the exhaust, or one of the exhausts, arranged close to the inlet forms an orifice able to fit on the top edge of said conduit when the lid is turned over on said receptacle. This arrangement improves the storage of the appliance.

Advantageously again, the inlet is formed by a top opening of the descending conduit and the top of the internal wall of the lid is concave as far as a rib interposed between the top of the lid and the exhaust, or one or the exhausts, the rib being arranged around the inlet when the lid closes off the cooking enclosure. This arrangement prevents condensates from falling into the descending conduit.

Advantageously, the ratio between the mean power delivered by the heating means during the initial phase of rise in temperature and the mean power delivered by the heating means after the triggering of the steam detector is greater than or equal to 1.5, and preferably greater than or equal to 2. This arrangement makes it possible to benefit from a shorter duration of rise in temperature.

According to another characteristic, an intermediate passage connects the cooking enclosure to the bottom chamber. In other words, the intermediate passage is arranged higher than the bottom chamber. The steam descends through the intermediate passage to the bottom chamber, the intermediate passage being able to be formed by one or more orifices in the wall of the cooking enclosure.

Advantageously, the exhaust or at least one of the exhausts connects the cooking enclosure to the outside through the intermediate passage. This arrangement improves the precision of the triggering of the detector. This is because a flow of steam escapes from the cooking enclosure to the outside, first of all passing through the intermediate passage and then through said exhaust or exhausts. When the output of steam becomes greater, the steam flow becomes turbulent. Some of the steam is then directed towards the bottom chamber in which the steam detector is disposed.

Then, advantageously, the cross-section of the intermediate passage is greater than 90% of the cross-section of the exhaust or exhausts. This arrangement facilitates the flow of some of the stream to the bottom chamber when the steam output becomes greater.

Advantageously again, the intermediate passage extends over a width greater than the width of said exhaust or exhausts. This arrangement also facilitates the flow of some of the steam to the bottom chamber when the output of steam becomes greater.

Advantageously, the intermediate passage is arranged in the top part of the cooking enclosure. The steam first of all having passed round the foodstuffs to be cooked before passing through the intermediate passage, the reduction in power of the heating element controlled by the detection of the steam occurs when the entire cooking enclosure and its content are saturated with steam. This arrangement reduces the duration of cooking, since the maximum power of the heating means is kept as long as possible. Compared with an identical appliance of maximum power, in which the maximum power is kept throughout the cooking, the cooking performance is identical but the total energy consumed is less and the discharge of steam out of the cooking enclosure is manifestly reduced.

BRIEF DESCRIPTION OF THE DRAWING

The invention will be better understood from a study of three exemplary embodiments, taken to be in no way limiting, and illustrated in the accompanying figures, in which.

DETAILED DESCRIPTION OF THE INVENTION

Figure 1:
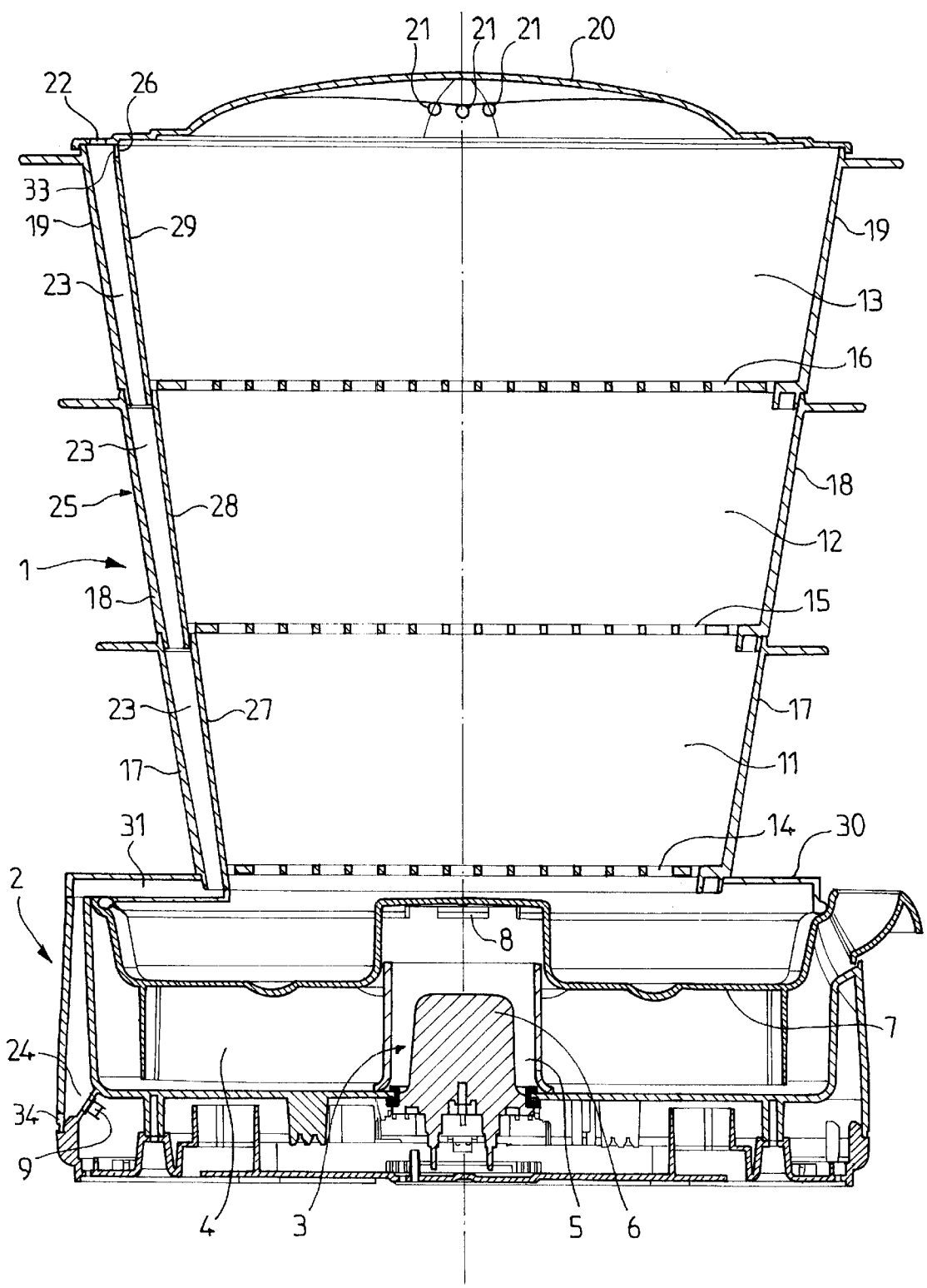
FIG. 1 is an elevational, cross-sectional view of a first exemplary embodiment of a domestic electrical appliance for cooking with steam according to the invention.

FIG. 1 shows a domestic electrical appliance for cooking with steam, having a cooking enclosure 1 disposed removably above a heating base 2.

The cooking enclosure 1 has three cooking receptacles 11, 12, 13 placed one above the other, each having a removable perforated bottom 14, 15, 16, and an annular upright side wall 17, 18, 19. The cooking receptacles shown in FIG. 1 nest together. A lid 20 closes the top receptacle 13.

The heating base 2 has a steam production device 3 comprising a main water reservoir 4 supplying a secondary water reservoir 5 associated with heating means 6. A liquor, or juice, or condensate recovery receptacle 7 provided with openings 8 for the passage of the steam is disposed above the heating base.

Figure 2:
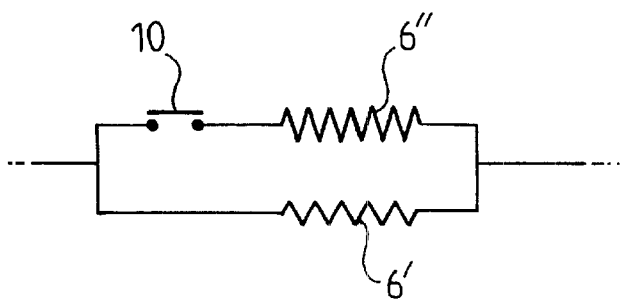
FIG. 2 is a partial electrical diagram of the heating unit of the appliance shown in FIG. 1.

The heating means 6 are formed by a heating element with two coils, as shown in FIG. 2. The first coil 6' has for example a power of 650 W and the second coil 6" has for example a power of 1300 W. A steam detector 9 is associated with means for reducing the power of the heating means 6. The steam detector 9 is for example formed by a thermostatic switch 10 connected in series with the second coil 6".

Direct exhausts 21 are arranged in the wall of the lid 20 closing off the cooking enclosure 1. An indirect exhaust 22 is arranged in the wall of the lid 20 forming a conduit 23 connected to a bottom chamber 24 of the appliance, situated in the heating base 2. The conduit 23 is provided in a side wall 25 of the cooking enclosure 1. The steam detector 9 is disposed in the heating base 2. As can be seen clearly in FIG. 1, the conduit 23 is a descending conduit. The steam detector 9 is disposed with a sensing surface in the chamber 24. A flow outlet 34 to the outside of the appliance is provided in the bottom of the chamber 24.

The conduit 23 is bordered in each of the cooking receptacles 11, 12, 13 on the one side by the side wall 17, 18, 19 and on the other side by an internal wall 27, 28, 29. Each internal wall 27, 28, 29 is curved in a horizontal plane to join the respective side wall 17, 18, 19 along two upright meeting lines. An intermediate passage 26 is provided between the cooking enclosure 1 and the conduit 23. More precisely, the intermediate passage 26 is formed by a break in the top part of the internal wall 29 belonging to the uppermost cooking receptacle 13. The cross-section of the intermediate passage 26 is substantially identical to the cross-section of the indirect exhaust 22. However, the width of the intermediate passage 26 is greater than the width of the indirect exhaust 22. The intermediate passage 26 forms the inlet 33 of the descending conduit 23. As is clearly visible in FIG. 1, the exhaust 22 is arranged close to the inlet 33 while the exhausts 21 are arranged at a distance from the inlet 33. The inlet 33 is arranged lower than the exhausts 21, 22.

The bottom, or lowermost, cooking receptacle 11 rests on an annular piece 30 placed on the recovery receptacle 7. A conduit 31 arranged in the annular piece 30 connects the conduit 23 of the cooking enclosure 1 to the bottom chamber 24 arranged in the heating base 2.

The appliance functions as follows. The user disposes the foodstuffs to be cooked with steam on the perforated bottom 14, 15, 16 of one or more of the receptacles of the cooking enclosure 1. When the appliance is started up, the thermostatic switch 10 is in the closed position and the two coils 6', 6" of the heating means 7 are powered. As long as the foodstuffs present in the cooking enclosure 1, or even the cooking enclosure itself, have not risen in temperature, the quantity of steam emitted by the exhausts 21 is low.

When the foodstuffs, or even the cooking chamber, have risen in temperature, the energy contributed by the steam is more difficult to transfer, and the flow of steam leaving through the exhausts 21 increases. The steam also escapes through the passage 26. However, as long as the flow remains non-turbulent, the steam passing through the passage 26 leaves through the exhaust 22.

When the flow of steam through the passage 26 becomes greater, the steam flow tends to become turbulent. The steam issuing from the passage 26 leaves with greater difficulty through the exhaust 22, in particular because of the width of the passage 26 which is greater than the width of the exhaust 22. Some of the steam then progresses through the conduit 23 and then through the conduit 31 in order to reach the bottom chamber 24 in which the steam detector 9 is housed. The rise in the temperature detected by the steam detector 9 due to the arrival of the steam causes the thermostatic switch 10 to open. The second coil 6" is disconnected and the cooking continues at reduced power.

Thus, the rise in temperature can be implemented rapidly while limiting the discharge of steam outside the appliance while the cooking is continued, in an optimized fashion, whatever the foodstuffs present in the cooking enclosure. A large release of steam is liable to occur only for a limited period, when the steam produced is no longer absorbed by the rise in temperature of the foodstuffs and of the cooking enclosure, and has not yet reached the steam detector.

Figure 3:
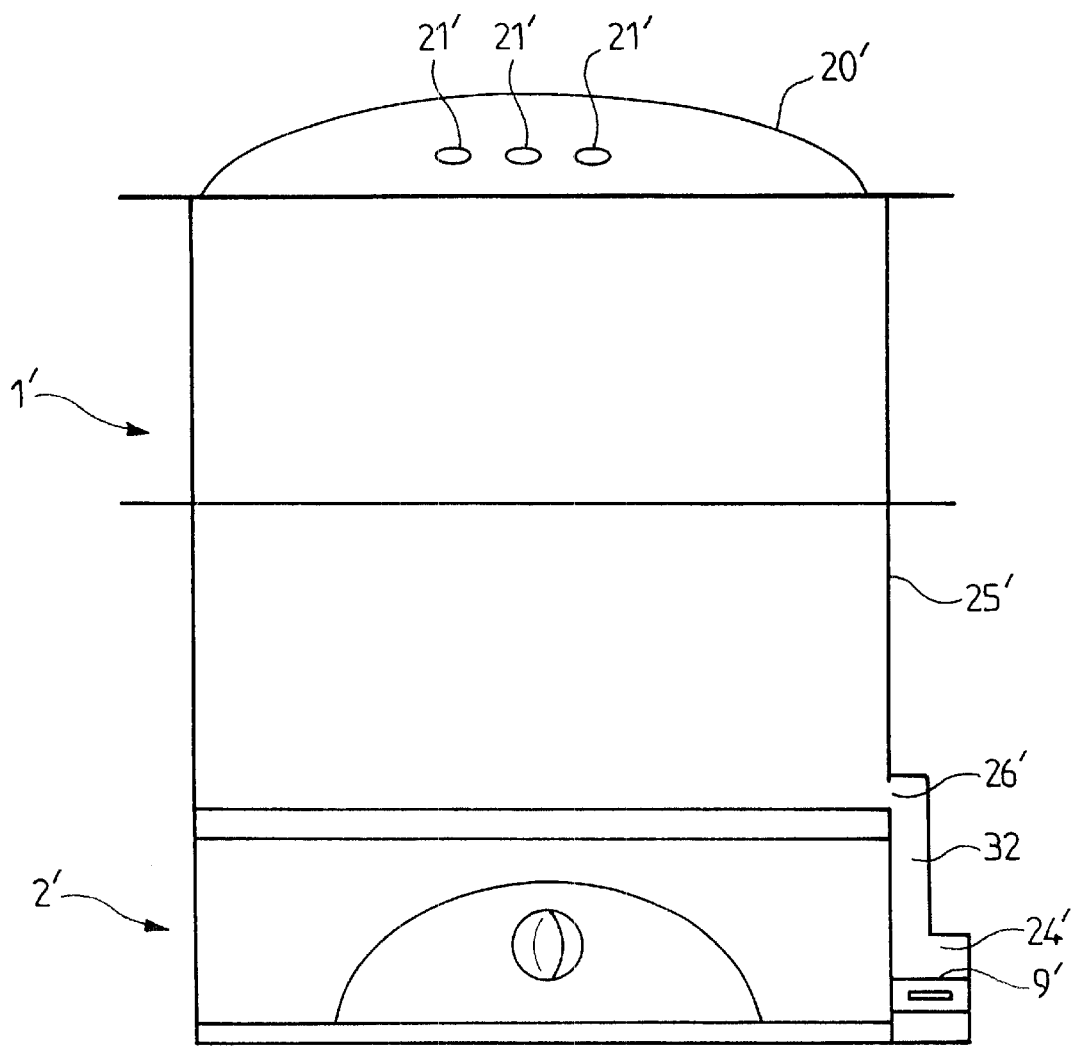
FIG. 3 is a simplified elevational view of a second exemplary embodiment of a domestic electrical appliance for cooking with steam according to the invention.

Another exemplary embodiment is shown schematically in FIG. 3. This exemplary embodiment differs from the previous exemplary embodiment in particular in that the cooking enclosure 1' has no conduit. Because of this, the lid 20' has no indirect exhaust.

The steam detector 9' is housed in a bottom chamber 24' arranged in the heating base 2'. The chamber 24' is connected to the cooking enclosure 1' by a conduit 32 provided in the heating base 2'. The conduit 32 communicates with the cooking enclosure 1' through an intermediate passage 26' provided in the bottom part of the side wall 25' of the cooking chamber.

The functioning of this exemplary embodiment is close to that of the previous exemplary embodiment. However, because the intermediate passage is provided in the bottom part of the cooking enclosure, the steam tends to flow along the intermediate passage earlier than when the intermediate passage is provided in the top part of the cooking enclosure. The result is a longer cooking time because of the reduction in the initial phase of functioning at full power. On the other hand, the release of steam outside the appliance before triggering of the detector may be reduced a little.

A third exemplary embodiment of a domestic electrical appliance for cooking with steam according to the invention is illustrated in FIGS. 4 to 7.

Figure 4:
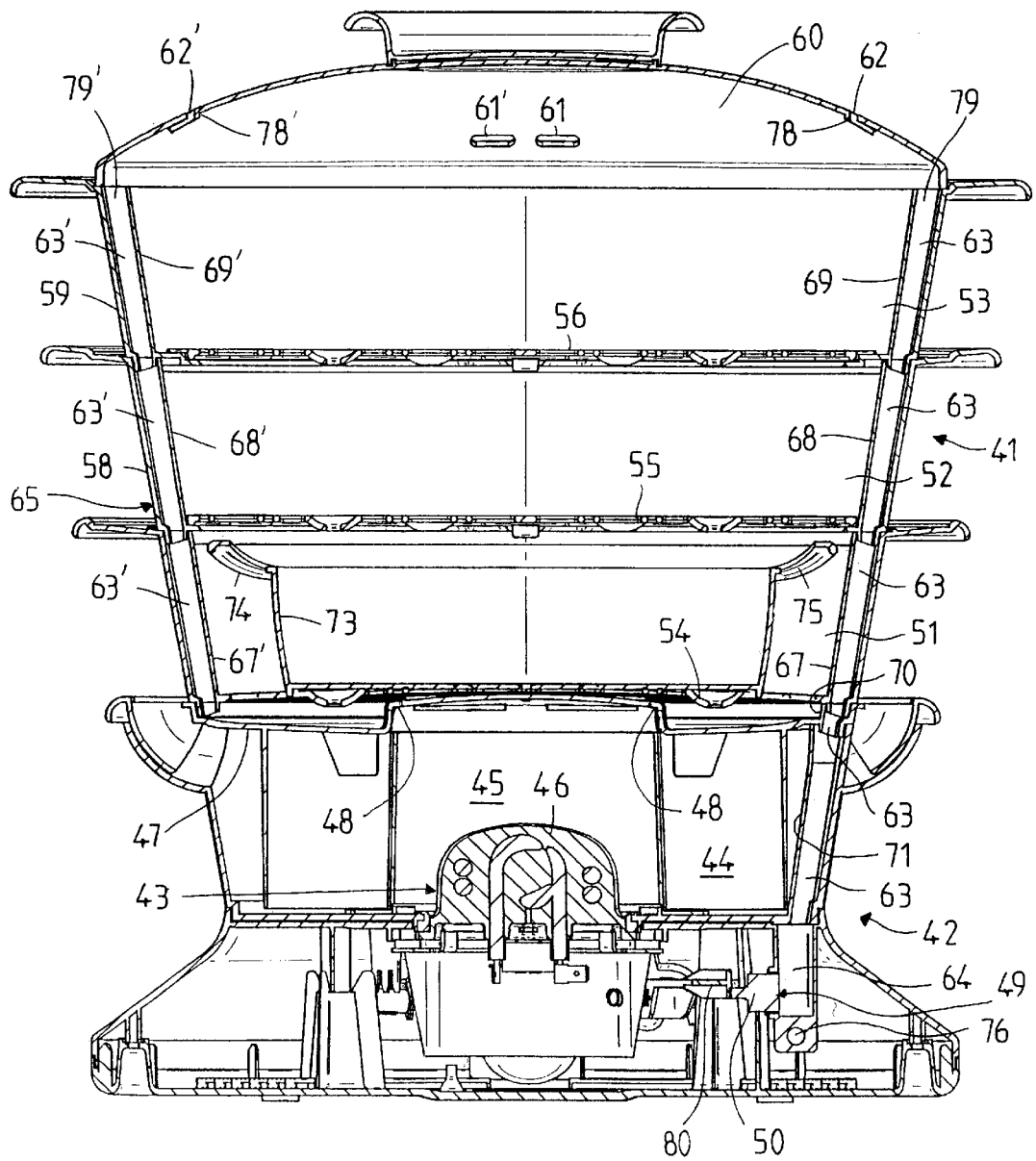
FIG. 4 is a view similar to that of FIG. 1 of a third exemplary embodiment of a domestic electrical appliance for cooking with steam according to the invention, in a cooking state.

As shown in FIG. 4, the appliance has a cooking enclosure 41 which is removable with respect to a heating base 42. The cooking enclosure 41 comprises three cooking receptacles 51, 52, 53 placed one on top of the other, closed off by a lid 60. The middle cooking receptacle 52 and the top cooking receptacle 53 each have a removable perforated bottom 55, 56 mounted on an annular upright side wall 58, 59. A rice bowl 73 with two handles 74, 75 rests on the perforated bottom 54 of the bottom cooking receptacle 51.

The cooking enclosure 41 rests on a liquor, or juice, or condensate recovery receptacle 47 having steam passage openings 48. The heating base 42 comprises a steam production device 43 having a cold-water reservoir 44 supplying a reservoir 45 in which there are arranged heating means 46 with two coils of 1350 W and 650 W.

Figure 7:
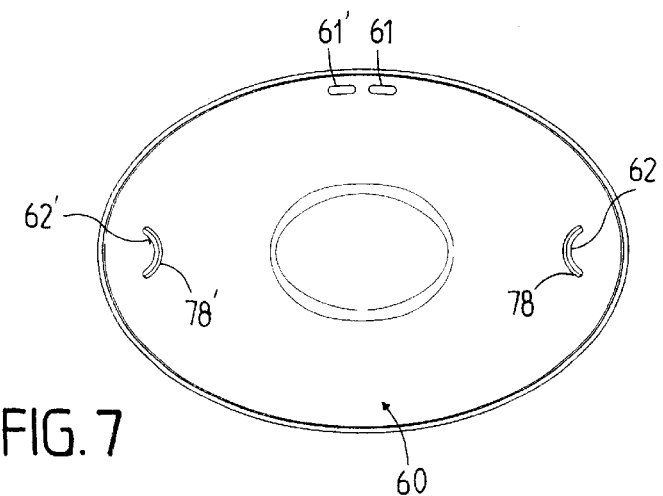
FIG. 7 is a bottom plan view of the lid of the third exemplary embodiment illustrated in FIGS. 4 to 6.

The lid 60 has two exhausts 61, 61' arranged side by side and two exhausts 62, 62' arranged so as to be diametrically opposed to one another, as can be seen more clearly in FIG. 7. The ratio between the total crosssection of the two exhausts 61, 61' and the cross-section of one of the exhausts 62, 62' is around 1.

Each of the cooking receptacles 51, 52, 53, the recovery receptacle 47, and the heating base 42 has an internal wall 67, 68, 69, 70, 71 forming a portion of a descending conduit 63 connecting the cooking enclosure 41 to a chamber 64 arranged in the base 42. Thus the conduit 63 is arranged at least partly in a side wall 65 of the cooking enclosure 41. The conduit is also provided at least partly in the heating base 42.

The cooking receptacles each have an internal wall 67', 68', 69' symmetrical with the wall 67, 68, 69. However, the descending conduit 63' formed by the wall 67', 68', 69' stops at the recovery receptacle 47.

In the side wall of the bottom chamber 64 there is disposed a thermostatic switch 50 mounted in series with the most powerful coil. The thermostatic switch 50 forms a steam detector 49. The thermostatic switch 50 has a manual reset and can be reset after triggering by means of a control 80 having a reset button accessible from outside the appliance. As can be seen most clearly in FIG. 6, a discharge conduit 76 connects the chamber 64 to a flow outlet 77 leading to the outside of the appliance. The outlet 77 is provided in the side wall of the base 42.

It will be noted in FIGS. 4 and 7 that a rib 78, 78' is interposed between the top of the internal wall of the lid 60 on the one hand and the exhaust 62 or the exhaust 62' on the other hand. The top part of the bottom wall of the lid 60 is concave.

The descending conduits 63, 63' are connected to the cooking enclosure 41 by respective inlets 79, 79'. The crosssection of each of the inlets 79, 79' is greater than the sum of the cross-sections of the exhausts 61, 61', 62, 62'. The inlets 79, 79' are arranged lower than the exhausts 61, 61', 62, 62'. The inlets 79, 79' form an intermediate passage between the cooking enclosure 41 and the conduits 63, 63'. The inlet of the descending conduit portion 63, 63' of each cooking receptacle 51, 52, 53 is formed by a top opening.

The ribs 78, 78' are arranged around the top opening of the descending conduits 63, 63' when the lid 60 closes off the cooking enclosure 41. Each cooking receptacle 51, 52, 53 is provided at its upper edge with an annular, outwardly projecting flange. The upper surface of each flange has a recess dimensioned to mate with the lid 60. The lid 60 can then rest on the receptacle 53, as shown in FIG. 4, or on the receptacle 52, or on the receptacle 51. The ribs 78, 78' make it possible to divert the condensates flowing under the bottom wall of the lid 60 and thus prevent drops of condensate from falling in the conduits 63, 63'.

Figure 5:
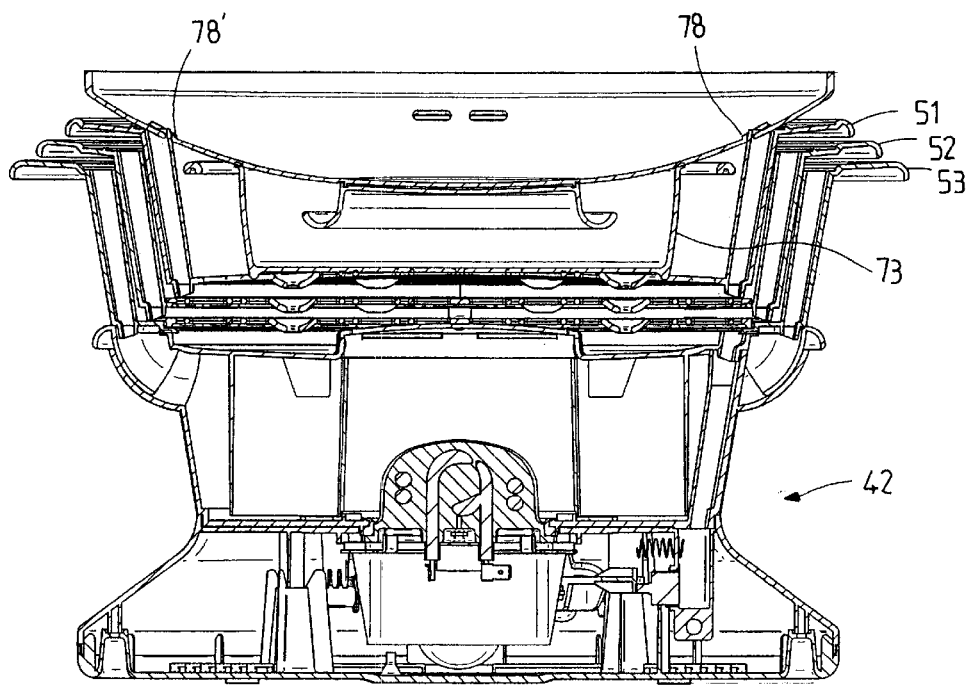
FIG. 5 is elevational, cross-sectional view of the third exemplary embodiment of a domestic electrical appliance for cooking with steam according to the invention, in a storage state.
Figure 6:
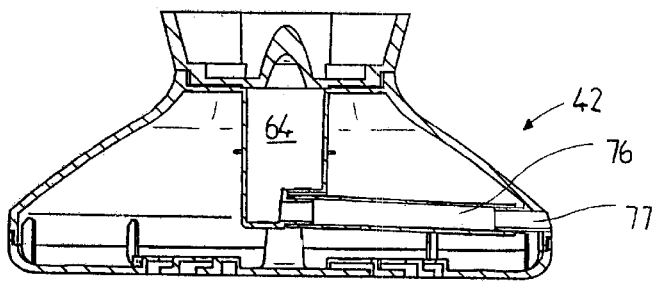
FIG. 6 is an elevational, cross-sectional view of the base of the third exemplary embodiment illustrated in FIGS. 4 and 5.

It will also be noted that, in the storage position illustrated in FIG. 5, the exhausts 62, 62' each form an orifice able to fit on the top edge of the wall 67, 67' when the lid 60 is turned over on the receptacle 51. The cooking receptacles 51, 52, 53 placed in reverse order to that used for cooking make it possible to reduce the height of the appliance when the latter is not being used. In the cooking position, the lid 60 and each of the receptacles 51, 52, 53 can occupy a position turned through 180° about the vertical without interfering with the functioning of the invention, because of the presence of the two conduits 63, 63' in the receptacles and the two exhausts 62, 62' in the lid.

The functioning of this third exemplary embodiment is similar to that of the first exemplary embodiment. At the start of the functioning of the appliance, the flow of steam out of the cooking enclosure increases progressively and then stabilizes at between 5 and 10 g of steam per minute. This threshold corresponds to the progressive rise in temperature of the foodstuffs. When the temperature of the foodstuffs is the same as that of the cooking enclosure, the flow of steam increases significantly. For a continuous heating power of 2000 W, the flow of steam can attain up to 40 to 50 g/min. The steam detector 49 formed by the thermostatic switch 50 controls the reduction in the heating means 46 from 2000 W to 650 W. The flow of steam then falls back to a value of between 5 and 10 g/min, which remains acceptable for domestic use. As soon as the thermostatic switch 50 is opened, the quantity of steam produced decreases rapidly and the descending conduit 63 is no longer supplied with steam.

The higher heating power available at the start of cooking makes it possible to reduce the duration of cooking, since the foodstuffs increase in temperature more quickly. Because the temperatures finally achieved remain the same as with cooking with steam carried out entirely at reduced power, but the duration of exposure of the foodstuffs to the cooking temperatures is less, a favorable impact on the preservation of vitamins is expected.

With an initial heating power less than 1.5 times the reduced power, the saving in time is low if the initial heating power is low, or the steam discharges remain too great at reduced power if the initial heating power is high. An initial heating power corresponding to twice the reduced power makes it possible to obtain significant results. With an initial heating power equivalent to three times the reduced power, it is possible to obtain a more rapid cooking and easy detection of the increase in steam production when the foodstuffs have increased in temperature.

The invention is not limited to the exemplary embodiments described. In particular, an exhaust could be provided in the conduit 32 of the second exemplary embodiment after the passage 26'. In the third exemplary embodiment, the walls 67', 68', 69' and/or the exhaust 62 could be omitted. The number and/or the shape and/or the arrangement of the exhausts could be modified without departing from the scope of the invention.

In more general terms, the cooking enclosure can have one or more cooking receptacles. The cooking receptacles can be interchangeable. The steam detector is not necessarily a thermostatic switch, but can be of any type, in particular a flow rate sensor or a humidity sensor. The conduit can belong only to the heating base. The power of the heating means can be adjusted by electronic means. The variation in power of the heating means can be obtained by an alternation of heating periods at full power and periods of stoppage. However, a simple switching between an initial power and a reduced power may suffice. The exhaust or exhausts are not necessarily provided in the top part of the cooking enclosure, but can in particular be produced on a side face of the cooking enclosure. The bottom chamber in which the steam detector is disposed may be angled and have a low point between the intermediate passage and the detector or between the inlet of the descending conduit and the detector. The steam detector is not necessarily arranged in the heating base, but may for example be disposed on the cooking enclosure. Moreover, the cooking enclosure may in part be fixed to the steam production device.

Many improvements can be made to these appliances in the context of the claims.

This application relates to subject matter disclosed in French Application Number 01 05647, filed Apr. 26, 2001, the disclosure of which is incorporated herein by reference.

What is claimed is:

1. A domestic electrical appliance for steam cooking, comprising:
    a steam production device (3; 43) that includes a water reservoir (5; 45) and heating means (6; 46) for heating water in said water reservoir;
    a cooking enclosure (1; 1'; 41) associated with said steam production device to be supplied with steam by said steam production device, said cooking enclosure having at least one exhaust (21, 22; 21'; 61, 61', 62, 62') to the outside;
    a steam detector (9; 9'; 49);
    control means operatively associated with said steam detector for reducing the rate of heat generation by said heating means; and
    a descending conduit (23; 32; 63) communicating between said cooking enclosure and said steam detector for directing a flow of steam from said cooking enclosure to said steam detector.

2. The domestic electrical appliance according to claim 1, wherein said steam production device (3; 43) further includes a main reservoir (4; 44) supplying said water reservoir (5; 45).

3. The domestic electrical appliance according to claim 1, further comprising a heating base (2; 2'; 42), and wherein said steam production device (3; 43) is arranged in said heating base and said cooking enclosure (1; 1'; 41) is removable with respect to said heating base.

4. The domestic electrical appliance according to claim 3, wherein said steam detector (9; 9'; 49) is disposed in said heating base (2; 2'; 42).

5. The domestic electrical appliance according to claim 1, wherein said descending conduit (23; 63) is provided at least partly in a side wall (25; 65) of said cooking enclosure (1; 41).

6. The domestic electrical appliance according to claim 5, wherein said cooking enclosure (1; 41) has at least two removable cooking receptacles (11, 12, 13; 51, 52, 53) each comprising a part of the descending conduit (23; 63).

7. The domestic electrical appliance according to claim 1, wherein said descending conduit (32; 63) is at least partly provided in the heating base (2'; 42).

8. The domestic electrical appliance according to claim 1, further comprising a chamber (24; 64) containing said steam detector and connected to a flow outlet (34; 76) leading out of said appliance.

9. The domestic electrical appliance according to claim 1, wherein said descending conduit (23; 63) is connected to said cooking enclosure (1; 41) by an inlet (33; 79) arranged at a lower level than said at least one exhaust (21, 22; 61, 61', 62, 62').

10. The domestic electrical appliance according to claim 1, wherein said descending conduit (63) is connected to said cooking enclosure (41) by an inlet (79) having a cross-section that is greater than the total cross-section of the at least one exhaust (61, 61', 62, 62').

11. The domestic electrical appliance according to claim 1, wherein said at least one exhaust comprises a plurality of exhausts and said descending conduit (23; 63) is connected to said cooking enclosure (1; 41) by an inlet (33; 79) arranged close to at least a first one of said plurality of exhausts (22; 62).

12. The domestic electrical appliance according to claim 11, wherein at least a second one of said plurality of exhausts (21; 61, 61', 62') is arranged at a distance from the inlet (33; 79).

13. The domestic electrical appliance according to claim 12, wherein the ratio between the total cross-section of the at least a second one of said plurality of exhausts (61, 61', 62') arranged at a distance from the inlet (79), and the total cross-section of the at least a first one of said plurality of exhausts (62) arranged close to the inlet (79), is between 1.6 and 2.4.

14. The domestic electrical appliance according to claim 1, further comprising a lid (20; 60) forming the top wall of the cooking enclosure (1; 41), and wherein said at least one exhaust (21, 22; 61, 61', 62, 62') is provided in said lid.

15. The domestic electrical appliance according to claim 14, wherein said descending conduit (23; 63) has an inlet (33; 79) arranged below said at least one exhaust (21, 22; 61, 61', 62, 62') provided in said lid (20; 60).

16. The domestic electrical appliance according to claim 15, wherein said cooking enclosure (41) comprises a cooking receptacle (51) in which at least one portion of said descending conduit (63) is provided, and in that said at least one exhaust is arranged close to said inlet (79) and forms an orifice able to fit on a top edge of said conduit (63) when said lid (60) is turned over on said receptacle (51).

17. The domestic electrical appliance according to claim 15, wherein: said inlet (79) is formed by a top opening of said descending conduit (63); said lid (60) has an internal wall provided with a rib (78); said internal wall has an upper part that is concave as far as said rib; said rib is interposed between said upper part of said internal wall of said lid (60) and said at least one exhaust (62); and said rib is arranged around said inlet when said lid closes off said cooking enclosure (41).

18. The domestic electrical appliance according to claim 1, wherein a first mean power level is delivered by said heating means (6; 46) during an initial phase of rise in temperature, and a first mean power level is delivered by said heating means (6') after the rate of heat generation is reduced by said control means, and the ratio between the first mean power level and the first mean power level is greater than or equal to 1.5.

19. The domestic electrical appliance according to claim 1, wherein said descending conduit extends downwardly from said cooking enclosure.

20. The domestic electrical appliance according to claim 1, wherein said detector is located in a chamber of said appliance.

* * * * *